United States Patent [19]

Takahashi et al.

[11] Patent Number: 5,895,142
[45] Date of Patent: Apr. 20, 1999

[54] IMAGE FORMING APPARATUS WITH SORTING FUNCTION

[75] Inventors: Atsushi Takahashi; Utami Soma; Kazumichi Yamauchi; Ryuji Okutomi, all of Hachioji, Japan

[73] Assignee: Konica Corporation, Tokyo, Japan

[21] Appl. No.: 09/063,693

[22] Filed: Apr. 21, 1998

[30] Foreign Application Priority Data

Apr. 25, 1997 [JP] Japan ................................ 9-109060

[51] Int. Cl.⁶ .................................................. G03G 15/00
[52] U.S. Cl. ........................... 399/85; 399/391; 399/410; 399/403; 358/401; 358/448
[58] Field of Search ........................... 399/85, 391, 410, 399/403; 358/401, 448

[56] References Cited

U.S. PATENT DOCUMENTS

| | | |
|---|---|---|
| 5,003,493 | 3/1991 | Okada et al. |
| 5,550,623 | 8/1996 | Tomita et al. |
| 5,621,541 | 4/1997 | Sakai et al. ............... 399/391 X |
| 5,627,650 | 5/1997 | Nosaki et al. ............. 399/408 X |
| 5,638,181 | 6/1997 | Kubo et al. ............... 399/364 X |
| 5,722,031 | 2/1998 | Fujii et al. ................ 399/410 X |
| 5,740,505 | 4/1998 | Kusumoto et al. ........ 399/200 |

*Primary Examiner*—Richard Moses
*Attorney, Agent, or Firm*—Frishauf, Holtz, Goodman, Langer & Chick

[57] ABSTRACT

An image forming apparatus includes: a first sheet feeding device for storing therein recording sheets; a second sheet feeding device for storing therein the same sized recording sheets as those stored in the first sheet feeding device in a direction perpendicular to the recording sheets stored in the first sheet feeding device; an image processing device capable of processing an image of a document under a condition that an image data thereof is rotated by 90°; an image forming device for forming an image on a recording sheet based on the image data processed by the image processing device; and a controller for detecting whether or not a sorting device for sorting the recording sheet is connected or operative. When the controller detects that the sorting device is neither connected nor operative, the controller controls the image processing device to carry out alternately a first image processing for forming the image by a regular image processing and a second image processing for forming the image under the condition that the image data is rotated by 90° to the image data by the regular image processing, and selects one of said first and second sheet feeding devices in accordance with the first and second image processing.

2 Claims, 5 Drawing Sheets

IMAGE FORMING APPARATUS WITH SORTING FUNCTION

BACKGROUND OF THE INVENTION

The present invention relates to an image forming apparatus by which an image is formed according to image data, and specifically to the improvement of a sorting operation at the time when a sheet on which an image is formed is ejected.

Generally, in an electrophotographic image forming apparatus such as a copier, printer, or the like, a document image is converted into electric signals (image data) corresponding to density in the document image information, and an electrostatic latent image is formed on a photoreceptor drum corresponding to the image data using laser light, or similar devices. The electrostatic latent image is developed and transferred onto a sheet as a toner image, and the toner image on the sheet is heated by a heater of a fixing device, and fused and fixed.

The sheets on which images are formed as described above, are needed to be sorted corresponding to the number of sets of sheets on which images are formed, and sorting is conducted by the following methods:

(1) The sheets are sorted such that the position is shifted for each set of sheets and the sheets are ejected (offset operation) by an ejecting and sorting device with a sorting function (finisher, sorter, etc.).

(2) The sheets are sorted by staple processing by an ejecting and sorting device with a sorting function (finisher, sorter, etc.).

(3) Image processing is conducted such that the image is rotated by 90° by an image processing means by a key operation of the operator, and the image is formed on the sheet placed in the direction which coincides with the image processing condition and the sheet is outputted.

As described above, it is necessary that sorting is conducted by either of an ejecting and sorting device with a sorting function, or an operator's manual operation.

Further, sorting by the above-described ejecting and sorting device can be conducted only when the performance of the ejecting and sorting device (the sorting function is provided or not) or its mounting condition (the ejecting and sorting device with the sorting function is connected to the apparatus or not) is confirmed and the sorting operation can be conducted.

Accordingly, the sorting operation is difficult when the ejecting and sorting device is connected to a network and therefore it is difficult to confirm whether the sorting function is provided or not. Further, the sorting operation can not be conducted in the following cases: the ejecting and sorting device with no sorting function is connected; the ejecting and sorting device with a sorting function is connected, but can not be used; and it is indicated to sort the sheets into bins more than the number of bins to be usable.

SUMMARY OF THE INVENTION

Accordingly, an object of the present invention is to provide an image forming apparatus which can sort the sheets independently of whether the ejecting and sorting device with the sorting function is connected to an image forming apparatus or not, or whether the ejecting and sorting device is provided with the sorting function or not.

That is, the above object can be attained by either of the following structure.

An image forming apparatus comprising: a sheet feeding means for holding the same sized sheets in 2 directions perpendicular to each other; an image processing means which can process image data on the condition that the image data is rotated by 90°; an image forming means for forming an image on a sheet, based on the image data processed by the image processing means; and a control means for detecting the condition of a sorting means to sort the sheets on which images are formed and which are ejected, and for controlling the sorting means so as to sort the sheets by alternately ejecting the sheet placed in the regular direction on which an image is formed by regular image processing, and the sheet in which image data is rotated by 90° and an image is processed by the image processing means, and which is selected from the sheet feeding means so as to coincide with the image processing condition and on which the image is formed, when the sorting means is on the condition that ejecting and sorting can not be conducted.

DETAILED DESCRIPTION OF THE PREFERRED EMBODIMENT

Figure 1:
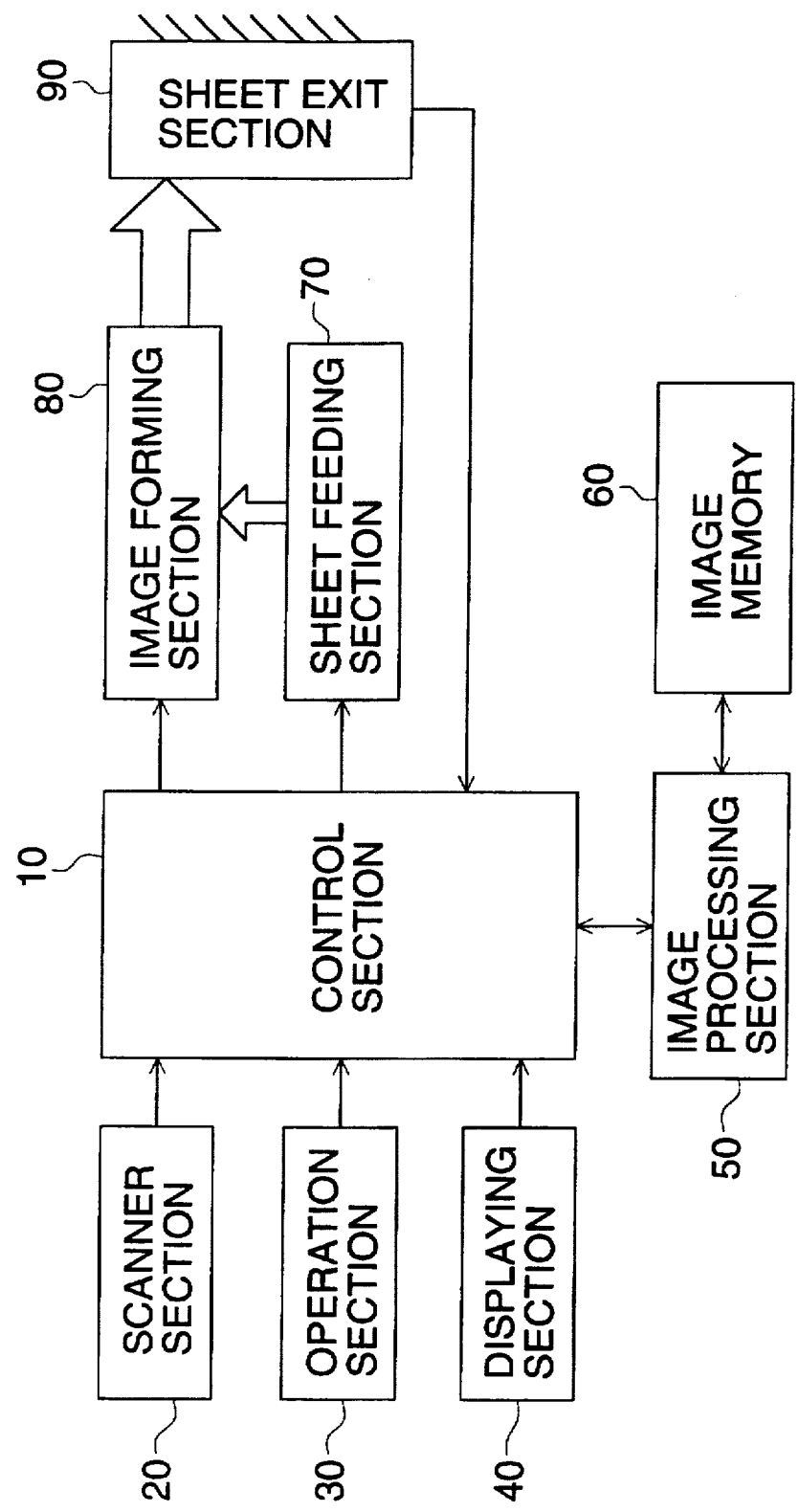
FIG. 1 is a functional block diagram showing the electrical structure of an image forming apparatus of an example of the present invention.

Hereinafter, referring to the drawings, an example of the present invention will be described.

FIG. 1 is a structural view showing the electrical structure of an image forming apparatus. Initially, referring to FIG. 1, the electrical structure of the image forming apparatus will be described below. In this connection, the image forming apparatus can be used for a printer, a copier, or the like, however, an example of a digital copier will be described.

In FIG. 1, a control section 10 controls overall operations of the image forming apparatus, and specifically in the present example, the control section 10 can control a sorting operation.

A scanner section 20 is an image reading means which reads a document image and generates image data, and send the image data to the control section 10.

An operation section 30 is an operation input means which receives each kind of operation and indication inputs concerning the image forming apparatus by the operator, and transmits data concerning operations or indication inputs to the control section 10.

A displaying section 40 is a display means to display a condition of operations of the image forming apparatus or a condition of the indication input in the operation section 30 as numerical values or a message, and displays it according to the indication from the control section 10.

An image processing section 50 is an image processing means such as a graphic controller, or the like, which image-processes the image data read by the scanner section 20, according to the indication of the control section 10, and in the present example, the image processing section 50 is provided with a function by which image data is rotated by 90° An image memory 60 is a memory as an operation area when the image processing section 50 conducts image processing. In this connection, a CPU, constituting the control section 10, can serve as the image processing section 50.

A sheet feeding section holds a plurality of kinds (size, direction) of sheets, and is a means to send the sheet (feed the sheet) to an image forming section according to the indication of the control section 10. Herein, the sheet feeding section 70 has, at least in the same sized sheet, sheets in the regular direction (A4, B5, . . . ) and the sheets in the direction which is rotated by 90° from the regular direction (A4R, B5R,. . . ).

An image forming section 80 is an image forming means to form the image data, which is image processed according to the indication of the control means 10, on the sheet by various types of image forming methods such as an electronic-photographic method, or the like, and forms an image on the sheet from the sheet feeding section 70.

A sheet exit section 90 is a device to eject the sheet on which the image is formed in the image forming section 80. The sheet exit section 90 may be in any of the following cases:

(1) the case where a sorting function is not provided to the sheet exit section;

(2) the case where both of a sheet exit tray provide with the sorting function (main sheet exit tray) and a sheet exit tray which is not provided with the sorting function (subsidiary sheet exit tray) are provided to the sheet exit section 90; and (3) the case where it is difficult to confirm whether the device is provided with the sorting function or not, from the outside computer which is connected to a network.

In this connection, in the present example, the sheet exit section 90 is in the case (2), and transmits the information about which sheet exit tray can be used, to the control section 10.

In FIG. 1, thin arrow marks between component blocks show the movement of each kind of data, and thick arrow marks show the movement of sheet.

Next, referring to a flow chart in FIG. 2, a sorting operation of the image forming apparatus of the present example will be described.

Figure 2:
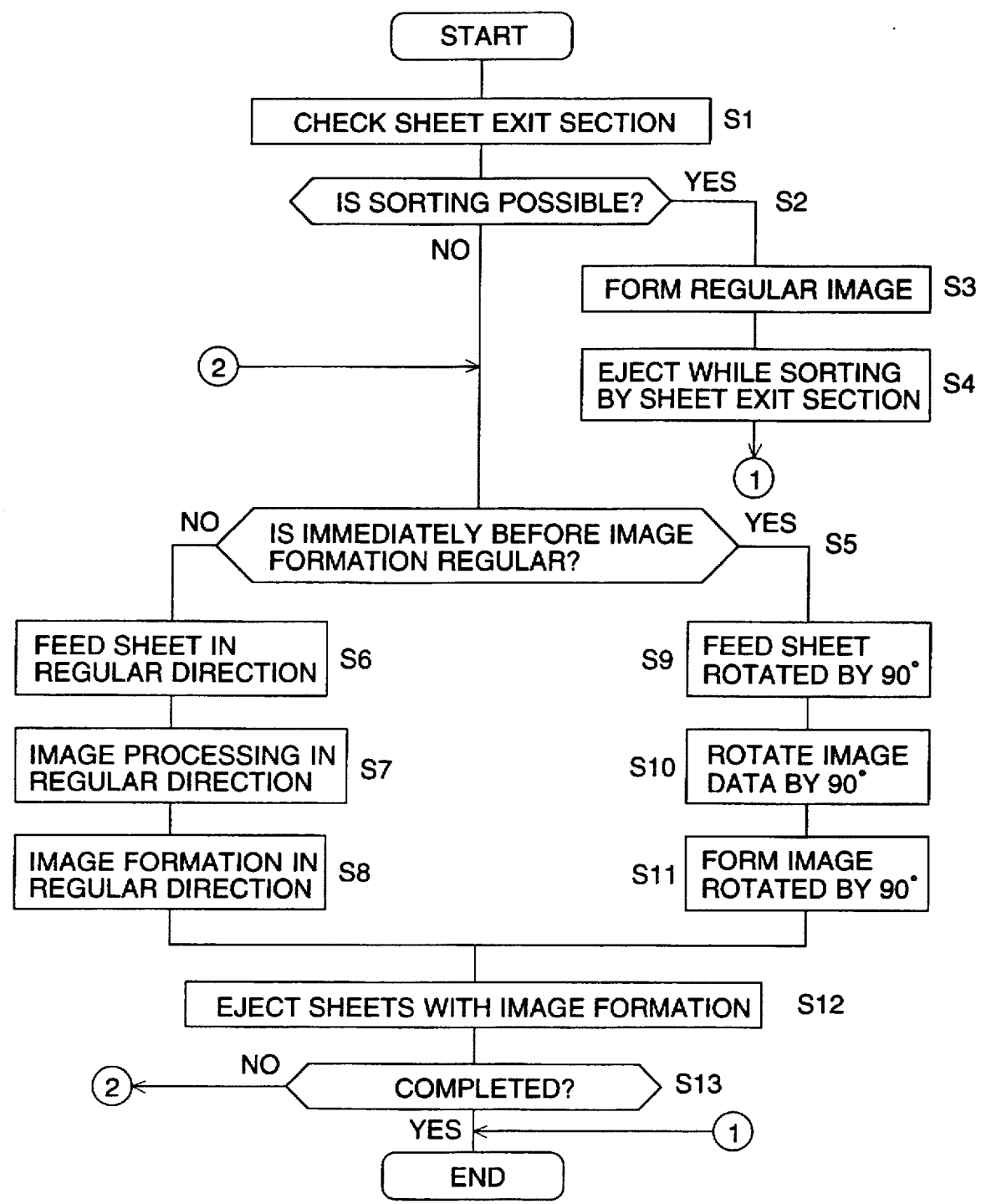
FIG. 2 is a flow chart showing an operational condition of an image forming apparatus of an example of the present invention.

Initially, the control section 10 checks a condition of the sheet exit section 90, and discriminates whether the sorting operation can be conducted or not (S1 in FIG. 2). That is, the followings are checked: whether the sheet exit section 90 connected to the image forming apparatus has the sorting function; when a plurality of sheet exit trays are provided in the sheet exit section 90 with the sorting function, whether the sheet exit tray with the sorting function can be used; and whether the sheet exit section 90 has enough sorting functions for the number of sorting, indicated by the operation section 30.

As a result of the discrimination, when the sorting operation can be conducted, the control section 10 indicates regular sheet feeding and image forming (S3 in FIG. 2) to the sheet feeding section 70 and the image forming section 80. Further, the control section 10 indicates sorting and ejecting by the sheet exit section 90 (S4 in FIG. 2) to the sheet exit section 90. Herein, an example in which a size A4 sheet is used in the regular image formation, will be described.

Figure 3:
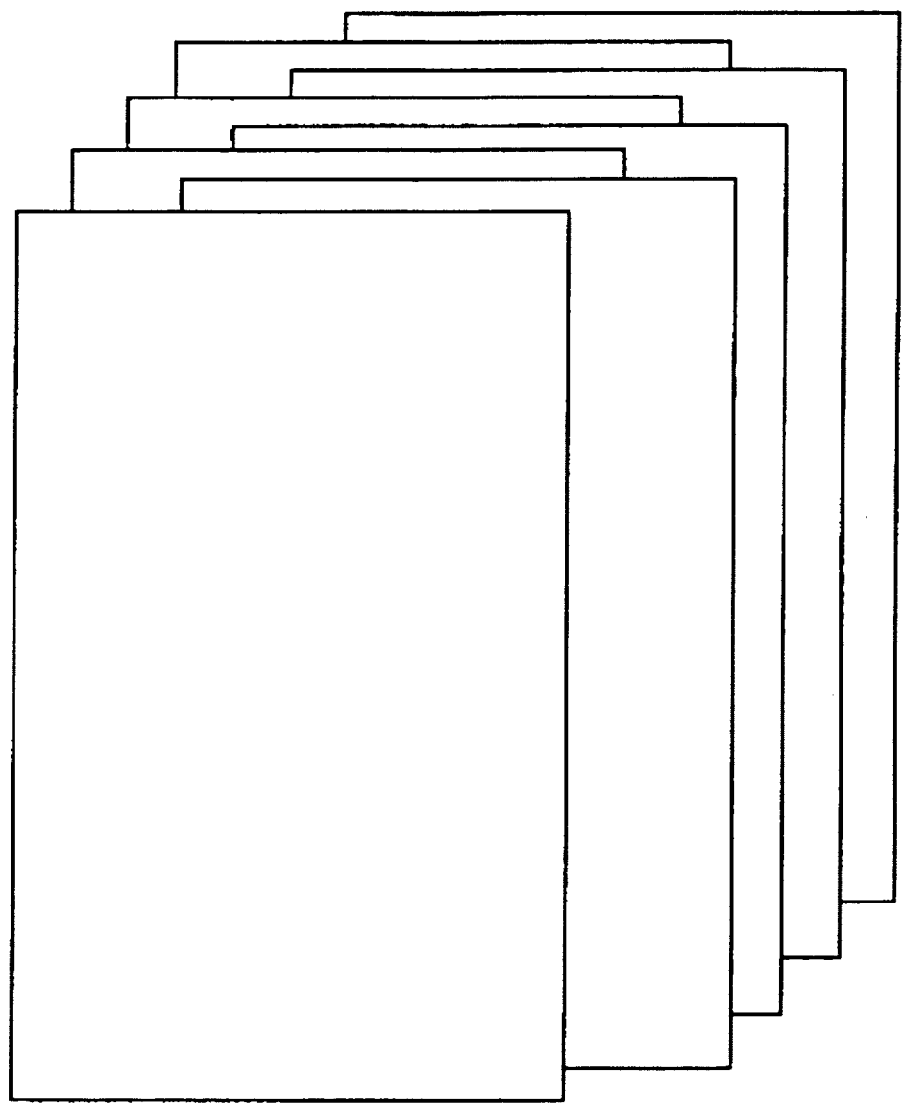
FIG. 3 an illustration typically showing a condition of sorting and ejecting by a sorting function of a sheet exit section of an image forming apparatus of an example of the present invention.
Figure 4:
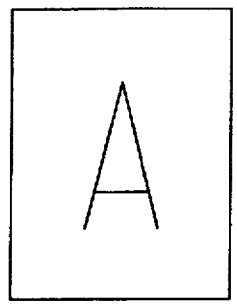
FIGS. 4(a) to 4(e) are illustrations typically showing conditions of sheet sorting and ejecting by the control of image processing and sheet feeding, without depending on the sorting function of the sheet exit section, in an image forming apparatus of an example of the present invention.
Figure 4:
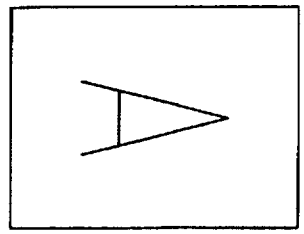
Figure 4:
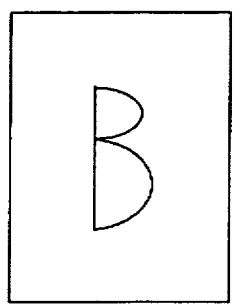
Figure 4:
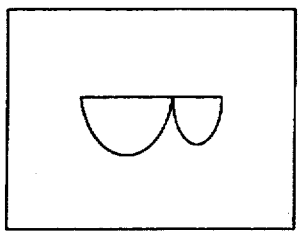
Figure 4:
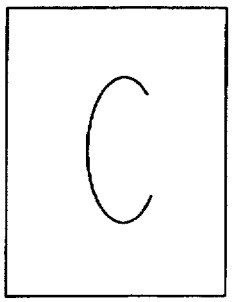

By the image formation and sorting and ejecting as described above, sorting is conducted based on the sorting function of the sheet exit section 90 as shown in FIG. 3. In FIG. 3, a condition of sorting by the shift tray sorter is typically shown, and the sheet is ejected on the condition in which sheets are shifted corresponding to the number of sets of sheets. In a bin type sorter, the sheet is ejected for each bin.

As a result of such discrimination, when the sorting operation in the sheet exit section 90 can not be conducted, the sorting operation independent of the sheet exit section 90, which is a feature of the present example, is conducted. That is, (1) ejection of the sheet (A4, B5, . . .) on which the image is formed by the regular image formation, and (2) the direction of the image on the memory 60 is rotated by 90°, the sheet (A4R, B5R, . . .) placed in the direction perpendicular to the regular sheet is fed, the image is formed thereon, and the sheet is ejected are alternately conducted, and thereby, the sorting operation can be conducted without using the sorting function of the sheet exit section 90.

In this connection, the regular image formation means that sheet feeding—image formation—ejection is conducted in the same direction as that of document reading in the scanner section 20. Further, rotation by 90° means that sheet feeding—image formation—ejection is conducted using the sheet placed in the direction different by 90° from the direction of document reading in the scanner section 20.

Initially, the control section 10 checks whether the immediately before image formation is conducted in the regular direction or in the direction rotated by 90°, in the sequence of image forming operations (S6 in FIG. 2). When the present sheet is the first sheet of the image formation, or the immediately before sheet is rotated by 90°, the sheet in the regular direction (A4 sized sheet) is fed from the sheet feeding section (S7 in FIG. 2), image data is image processed in the regular direction (S8 in FIG. 2), the image formation (latent image formation—transfer—fixing) is conducted (S9 in FIG. 2), and the sheet is ejected in the direction in which the image is formed, from the sheet exit section 90 (S10 in FIG. 2).

Further, when the immediately before image formation is conducted in the regular direction, the sheet placed in the direction different by 90° from the regular direction (A4R sheet) is fed from the sheet feeding section (S10 in FIG. 2), image processing is conducted so that image data is rotated by 90° on the memory 60 (S11 in FIG. 2), the rotated image is formed (latent image formation—transfer—fixing) (S12 in FIG. 2), and the sheet is ejected in the direction in which the image is formed, from the sheet exit section 90 (S10 in FIG. 2).

In this connection, as the image processing in which image data is rotated by 90°, various processing can be considered as follows: image data is actually rotated on the memory 60; image data on the memory 60 is not directly processed, and the reading address from the image processing section 50 is operated so that the image data is apparently rotated, or similar processing.

The regular image formation using A4 sheet and the image formation using A4R sheet, in which image data is rotated by 90°, as described above, are alternately conducted until the number of sets of sheets reaches the required number (S5–S13 in FIG. 2).

The state in which the image formation is alternately repeated in the direction different from each other by 90°, is typically shown in FIGS. 4(a) to 4(e). The state in which the sheets whose directions are alternately different from each other as shown in FIGS. 4(a) to 4(e), are ejected from the sheet eject section 90 as they are, is shown in FIG. 5.

Figure 5:
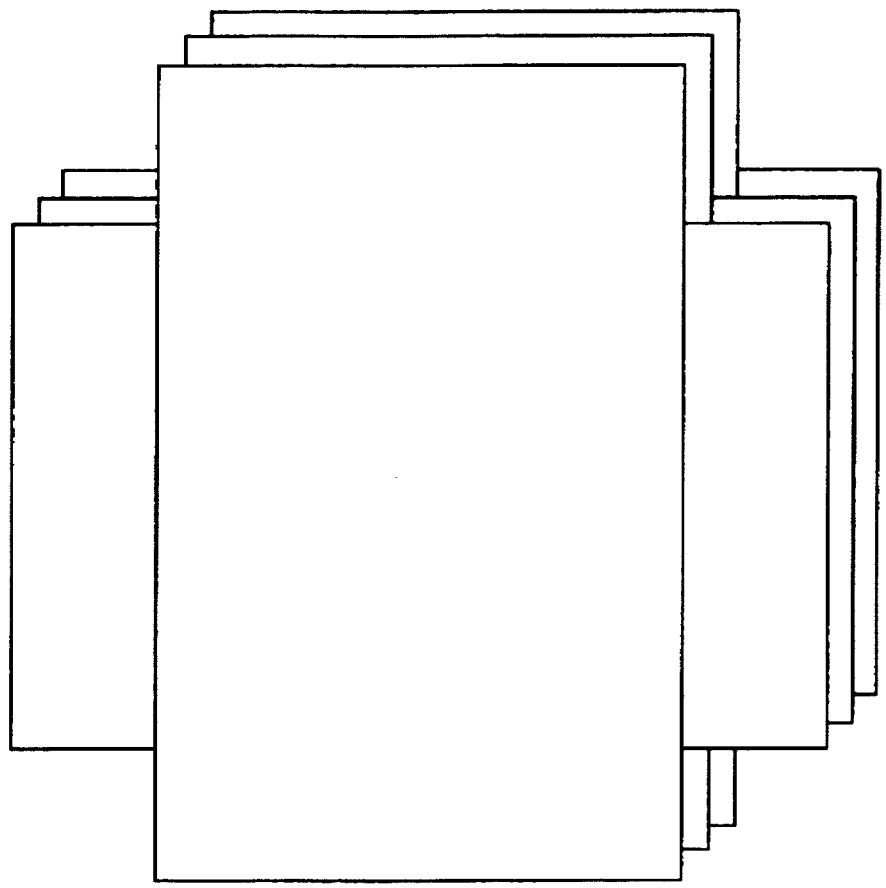
FIG. 5 is an illustration typically showing a condition of sheet sorting and ejecting by the control of image processing and sheet feeding, without depending on the sorting function of the sheet exit section, in an image forming apparatus of an example of the present invention.

As shown in FIG. 5, the sorting operation is possible without depending on whether the ejecting and sorting device with the sorting function is connected to the apparatus or not, whether the ejecting and sorting device has the sorting function, or not, or whether the ejecting and sorting device can be operated or not.

Incidentally, in the above examples, the sheet exit section 90 has the sheet exit tray with the sorting function (main sheet exit tray) and the sheet exit tray without the sorting function (subsidiary sheet exit tray). The sorting and ejecting by the sorting function of the sheet exit section (main tray)/the sorting and ejecting without depending on the sorting function of the sheet exit tray (subsidiary tray) are switched corresponding to the state of the sheet exit tray 90.

Other than the above example, when it is previously clear that the image forming apparatus has no sorting function, or when it is difficult to confirm whether the image forming apparatus has the sorting function, by a computer connected to the network, only sorting and ejecting without depending on the sorting function of the sheet exit section as shown by S5–S13 in FIG. 2 in the above example, may be conducted.

As detailed above, according to the present invention, the following effects can be obtained.

According to the invention, the sorting operation can be conducted by ejecting the sheet in the regular direction and in the direction rotated by 90° without depending on whether the ejecting and sorting device with the sorting function is connected to the apparatus or not, and whether the ejecting and sorting device has the sorting function or not.

What is claimed is:

1. An image forming apparatus comprising:

(a) a first sheet feeding means for storing therein recording sheets;

(b) a second sheet feeding means for storing therein the same sized recording sheets as those stored in the first sheet feeding means in a direction perpendicular to the recording sheets stored in the first sheet feeding means;

(c) an image processing means capable of processing an image of a document under a condition that an image data thereof is rotated by 90°;

(d) an image forming means for forming an image on a recording sheet based on the image data processed by the image processing means; and (e) a control means for detecting whether or not a sorting means for sorting the recording sheet is connected or operative, wherein when the control means detects that the sorting means is neither connected nor operative, the control means controls the image processing means to carry out alternately a first image processing for forming the image by a regular image processing and a second image processing for forming the image under the condition that the image data is rotated by 90° to the image data by the regular image processing, and selects one of said first and second sheet feeding means in accordance with the first and second image processing.

2. The image forming apparatus of claim 1, wherein when the control means detects that the sorting means is connected and operative, the control means instructs the sorting means to sort, and controls the image processing means to form the image by one of the first and second image processing.

* * * * *